(12) United States Patent
Vemulapati et al.

(10) Patent No.: US 10,300,863 B1
(45) Date of Patent: May 28, 2019

(54) VEHICLE CONSOLE ASSEMBLY

(71) Applicant: Ford Global Technologies, LLC, Dearborn, MI (US)

(72) Inventors: Satyanarayana Raju Vemulapati, Westland, MI (US); Wei Xu, Nanjing (CN); Justin Aymen, Sterling Heights, MI (US); Tyler Kramer, Dearborn, MI (US); Linh Doan, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 9 days.

(21) Appl. No.: 15/886,060

(22) Filed: Feb. 1, 2018

(51) Int. Cl.
*B60R 7/04* (2006.01)
*B60R 13/02* (2006.01)
*B60R 11/00* (2006.01)

(52) U.S. Cl.
CPC ............ B60R 7/04 (2013.01); B60R 13/0212 (2013.01); *B60R 2011/0028* (2013.01); *B60R 2013/0287* (2013.01)

(58) Field of Classification Search
CPC .................. B60R 7/04; B60R 13/0212; B60R 2013/0287; B60R 2011/0028; B60K 2350/922; B60Q 3/51; B60Q 3/76; B60Q 2500/10
USPC ....................................... 296/37.7, 214, 97.9
See application file for complete search history.

(56) References Cited

U.S. PATENT DOCUMENTS

| | | | |
|---|---|---|---|
| 4,909,470 | A | 3/1990 | Clark |
| 6,126,221 | A | 10/2000 | Kern |
| 6,575,528 | B2 | 6/2003 | Tiesler et al. |
| 8,770,644 | B2 | 7/2014 | Harders et al. |
| 9,278,642 | B2 | 3/2016 | Colombo et al. |
| 2006/0113810 | A1 | 6/2006 | Kuhl et al. |

*Primary Examiner* — Dennis H Pedder
(74) *Attorney, Agent, or Firm* — Vichit Chea; Price Heneveld LLP

(57) ABSTRACT

A vehicle overhead console is provided herein. The vehicle overhead console includes a housing having a locator and a retainer tower extending vertically above the housing. The retainer tower has a rib. A bracket is configured to couple to a vehicle headliner and defines a channel. The channel includes a central channel and a plurality of transverse slots and the tower is disposed within the central channel and the rib is disposed within the transverse channel.

20 Claims, 9 Drawing Sheets

VEHICLE CONSOLE ASSEMBLY

FIELD OF THE INVENTION

The present disclosure generally relates to vehicle consoles, and more particularly, to vehicle overhead consoles within a vehicle cabin.

BACKGROUND OF THE INVENTION

Overhead consoles are employed in vehicles to provide various functions. For some vehicles, it may be desirable to have an overhead console that may be installed in a repeatable position and/or manufactured at reduced costs when compared to current overhead console assemblies.

SUMMARY OF THE INVENTION

According to one aspect of the present disclosure, a vehicle overhead console is provided herein. The vehicle overhead console a housing having a locator and a retainer tower extending vertically above the housing, the retainer tower having a rib. A bracket is configured to couple to a vehicle headliner and defines a channel. The channel includes a central channel and a plurality of transverse slots. The retainer tower is disposed within the central channel and the rib is disposed within the transverse slots.

According to another aspect of the present disclosure, an overhead console for a vehicle is provided herein. The overhead console includes a housing having a locator and a retainer tower. A bracket is configured to couple to a vehicle headliner and defines a channel. The retainer tower has a width that is less than a width of the channel. A support member is operably coupled with the vehicle headliner. The locator includes an upper section disposed above the support member and a lower section disposed below the vehicle headliner.

According to yet another aspect of the present disclosure, a vehicle overhead console is provided herein. The vehicle overhead console includes a housing having a retainer tower extending vertically above the housing, the retainer tower having a rib. A locating tab extends from the retainer tower. A bracket is configured to couple to a vehicle headliner and defines a channel. The channel has a length longer than a length of the retainer tower and the rib has a width less than a width of the transverse slot.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
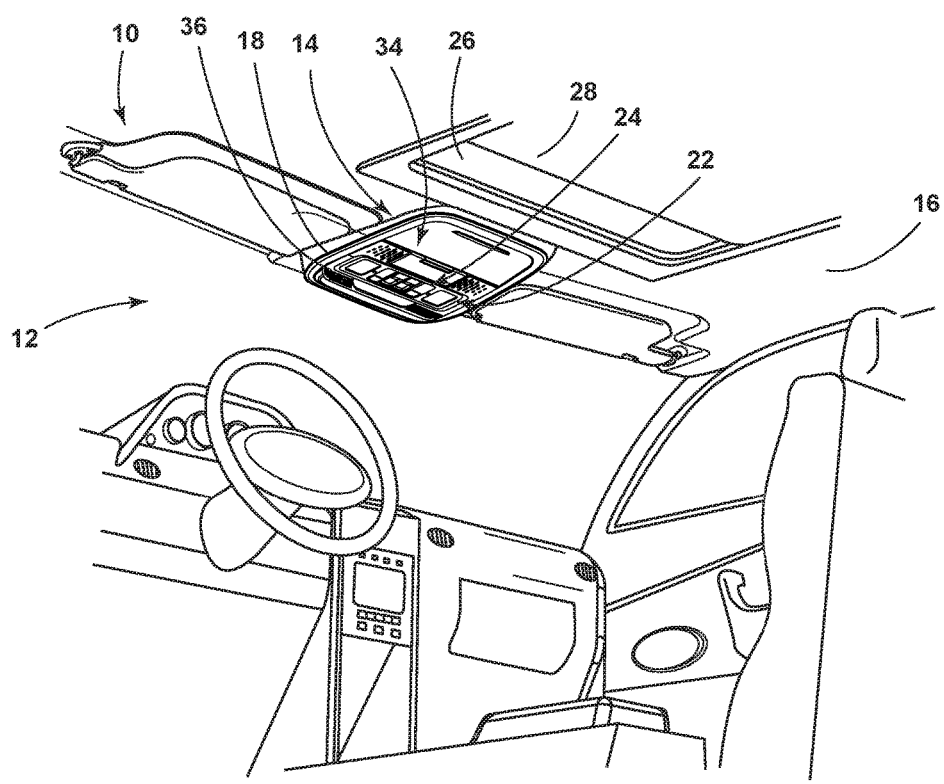
FIG. 1 is a perspective view of a front portion of a vehicle cabin having an overhead console therein, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a console assembly that may be disposed within a vehicle cabin. In some examples, the console may be configured as an overhead console that is disposed above passengers once installed within the vehicle. The console may include one or more locators and/or one or more clips/retainers for attaching the console to a proximate structure of the vehicle. In some examples, the one or more locators and/or one or more clips/retainers described herein may assist in locating the console into a predefined attachment position.

Figure 2:
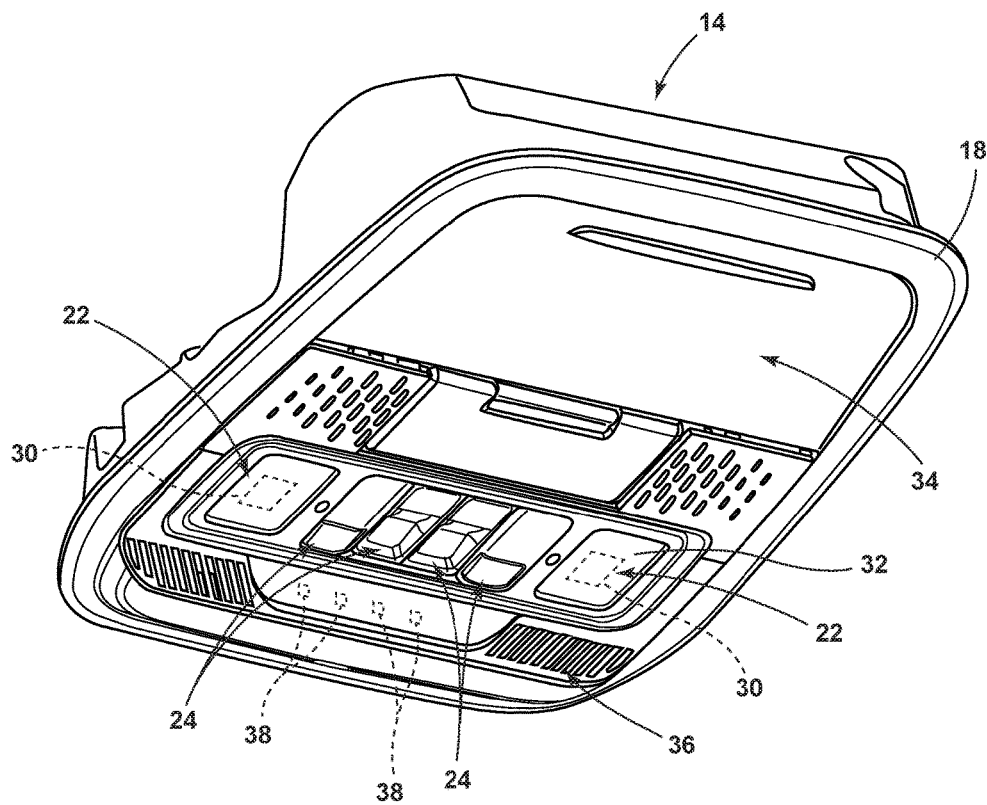
FIG. 2 is a bottom perspective view of the overhead console having a pair of lamps therein, according to some examples.

Referring to FIGS. 1 and 2, an interior of an automotive vehicle 10 is generally illustrated having a cabin 12 and an overhead console 14 disposed within the cabin 12. The overhead console 14 is assembled to a headliner 16 on an underside of a roof or ceiling of the vehicle cabin 12, generally above a front passenger seating area. It will be appreciated, however, that the overhead console 14 may be disposed in any other location of the vehicle 10 without departing from the scope of the present disclosure.

The overhead console 14 includes a housing 18 that defines a cavity. A wide range of assemblies may be disposed within the cavity. For example, one or more lamp assemblies 22 and/or one or more switches 24 may be disposed in the cavity. The one or more switches may control any of a number of vehicle devices and functions, such as controlling the movement of a sunroof or moonroof 26, controlling the movement of a moonroof shade 28, controlling activation of one or more lamp assemblies 22, and various other devices and functions. The switches 24 may include electrical switches in communication with a variety of vehicle systems and in some examples may include biased switches or toggle switches. The lamp assemblies 22 may be configured as interior map/reading lights, dome lights, ambient lights, and/or any other type of light without departing from the scope of the present disclosure. The lamp assemblies 22 may include a light source 30, a reflector, one or more lenses 32, and/or a trim member.

The switches 24 shown in FIGS. 1 and 2 each provide control of a vehicle component or device or provide a designated control function. One or more of the switches 24 may be dedicated to controlling the movement of a sunroof or moonroof 26 so as to cause the moonroof 26 to move in an open or closed direction, tilt the moonroof, or stop the movement of the moonroof based upon a control algorithm. One or more other switches 24 may be dedicated to controlling the movement of a moonroof shade 28 between open and closed positions. Each of the moonroof 26 and shade 28 may be actuated by an electric motor in response to actuation of the corresponding switch 24. Other switches 24 may be dedicated to controlling other devices, such as activating/deactivating the lamp(s), unlocking a trunk, or opening a rear hatch. Additional controls via the switches 24 may include actuating door power windows between open and closed positions. Various other vehicle controls may be controlled by way of the switches 24 described herein.

The overhead console 14 may further include a sunglass bin 34. The sunglass bin 34, as discussed herein, may include any form of storage bin, tray, or any other form of compartment configured to provide a selectively accessible storage pocket. In some examples, the sunglass bin 34 may be configured to have an interior portion configured to store glasses, sunglasses, or any other items having similar dimensional properties.

The console housing 18 may further include a hands-free phone assembly 36. The hands-free phone assembly 36 may include a speaker and/or a microphone. The microphone may be a unidirectional microphone or an array of microphones. If the microphone is a unidirectional microphone, the microphone is disposed, for example, in such a manner that the directivity thereof is directed toward the head of a passenger. An array microphone is a microphone in which multiple microphones are arranged close to each other in an array and whose directivity can be directed in any direction by signal processing.

One or more illuminable indicia 38 may also be disposed on the overhead console 14. The indicia 38 may provide any desired information to passengers of the vehicle 10. In some examples, the indicia 38 may be disposed on a backlit film. Each of the indicia 38 may be toggled between an illuminated and an unilluminated state to provide the status of a system that is designated by each respective indicium 38.

The light source 30 is disposed within the overhead console 14 and is coupled to a circuit board. The circuit board may be secured to and/or within the overhead console 14. The light source 30 may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the overhead console 14. Further, various types of LEDs are suitable for use as the light source 30 including, but not limited to, top-emitting LEDs, side-emitting LEDs, and others. Moreover, according to various examples, multicolored light sources 30, such as Red, Green, and Blue (RGB) LEDs that employ red, green, and blue LED packaging may be used to generate various desired colors of light outputs from a single light source 30, according to known light color mixing techniques.

The circuit board may be configured as a printed circuit board (PCB) that is operably coupled to a controller including control circuitry including LED drive circuitry for controlling activation and deactivation of the light source 30. The controller may be disposed in the vehicle 10 and/or within the overhead console 14. The circuit board may be configured in any fashion known in the art including, but not limited to, any flexible PCB and/or rigid PCB. The controller may activate the light source 30 based on a plurality of inputs and may modify the intensity of the light emitted by the light source 30 by pulse-width modulation, current control, and/or any other method known in the art. In various examples, the controller may be configured to adjust a color and/or intensity of light emitted from the light source 30 by sending control signals to adjust an intensity or energy output level of the light source 30. According to some examples, the controller may increase the intensity of light emitted from the light source 30 up to five times steady state.

Figure 3:
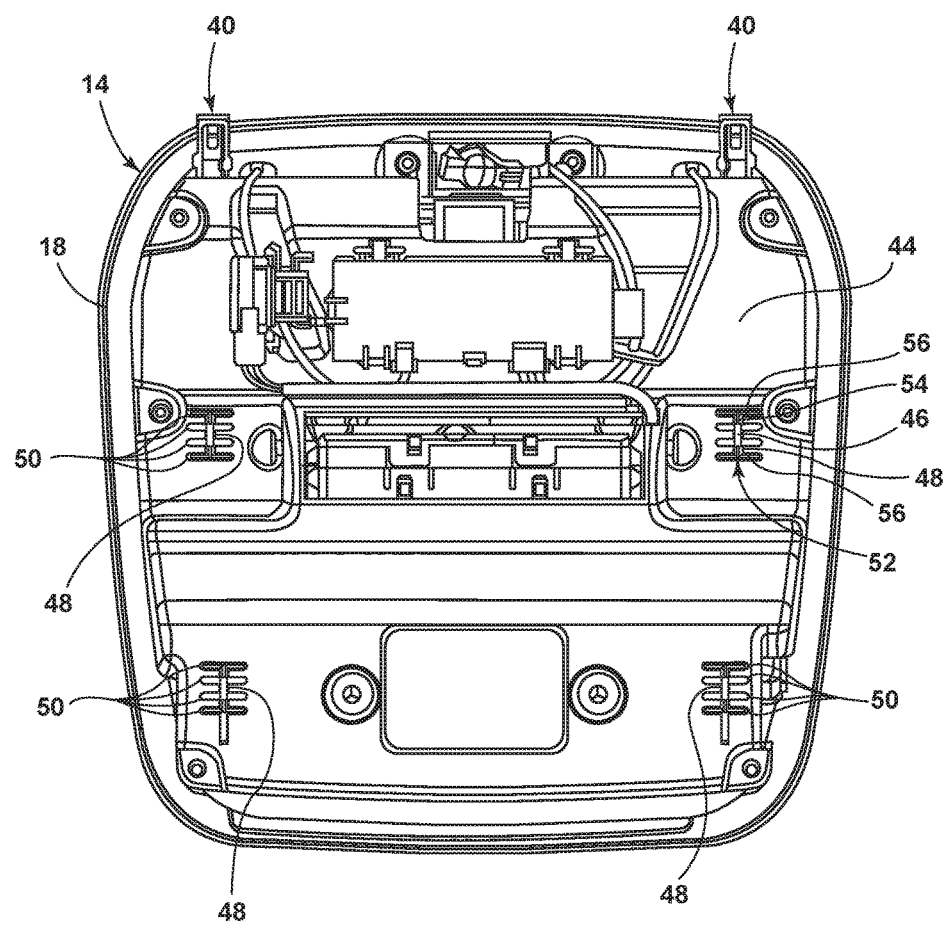
FIG. 3 is a top plan view of the overhead console and a bracket configured to couple with the overhead console, according to some examples.

Referring to FIG. 3, the overhead console 14 may include and/or be operably coupled with a bracket 44. The bracket 44 may be in the form of a reinforcement bracket 44 that provides support for the housing 18 in an installed position. Accordingly, the bracket 44 may operably couple with the headliner 16 and the housing 18 may be removably fixed to the bracket 44 to place the housing 18 in an installed position. In some examples, the bracket 44 may include attachment points through which clips and/or retainers 46 on the housing 18 may be inserted. As illustrated, the attachment points are defined by a central channel 48 and a plurality of transverse slots 50. As will be described in greater detail below, the retainers 46 may be disposed on retainer towers 52 of the housing 18. The retainer towers 52 may include a body portion 54 and one more ribs 56 extending therefrom. The ribs 56 may be disposed within the transverse slots 50 to assist in locating the housing 18 in a cross-car direction, and/or in a vehicle forward/rearward direction. It will be appreciated, however, that in some examples the bracket 44 may define any one or more channels 48. It will also be appreciated that any number of slots 50 may extend from the central channel 48 in any direction without departing from the scope of the present disclosure. Moreover, the central channel 48 may be any channel having no slots 50, or any number of slots 50, extending therefrom.

Figure 4A:
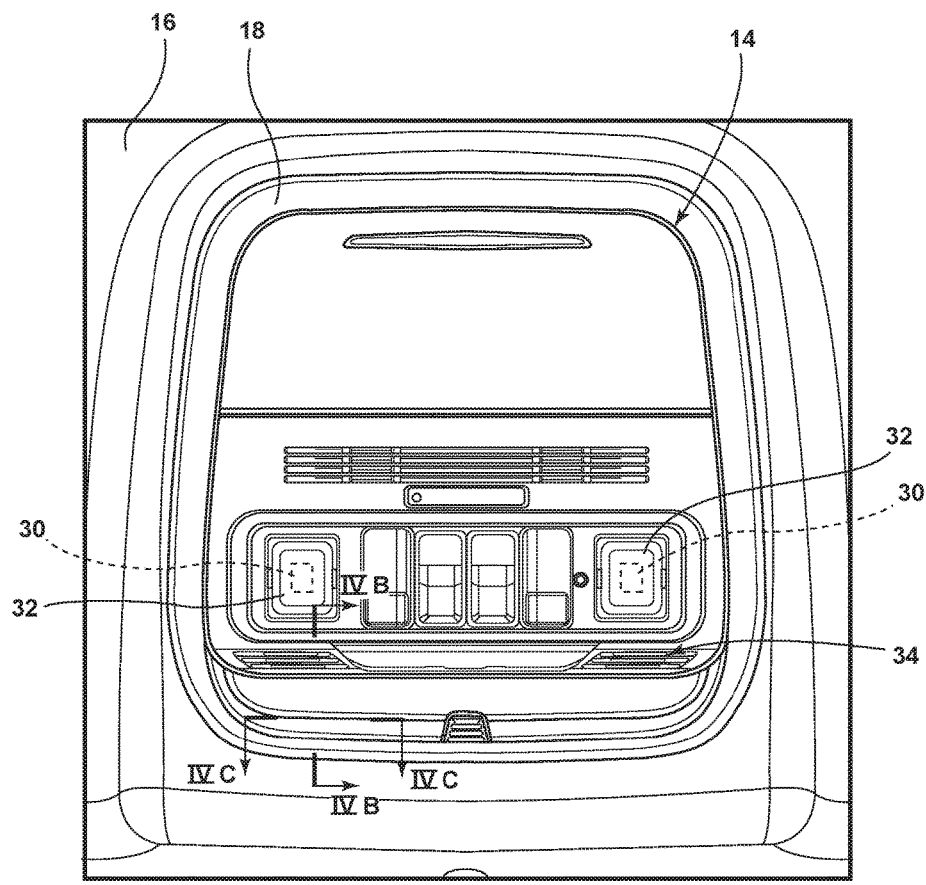
FIG. 4A is a bottom plan view of the overhead console and a headliner surrounding the overhead console, according to some examples.
Figure 4B:
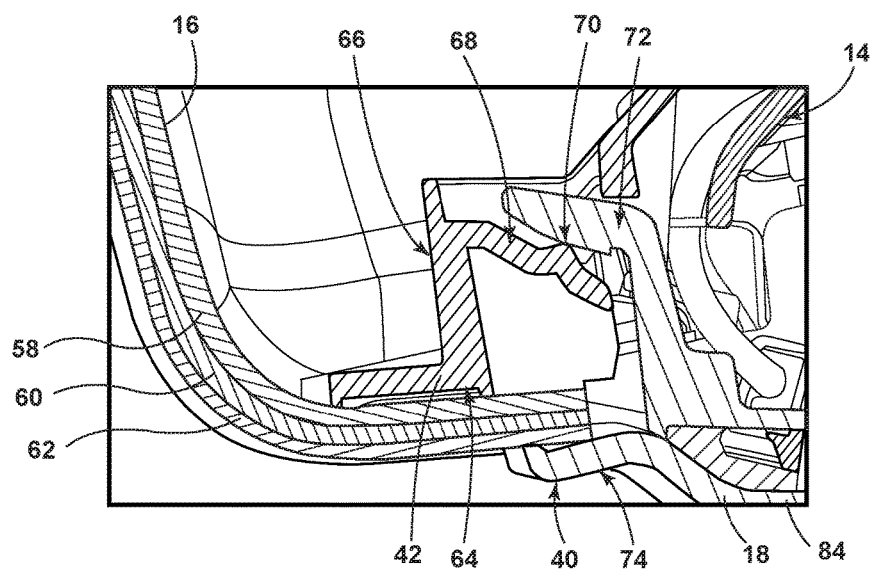
FIG. 4B is a cross-sectional view of the overhead console taken along the line IVA-IVA of FIG. 4A.
Figure 4C:
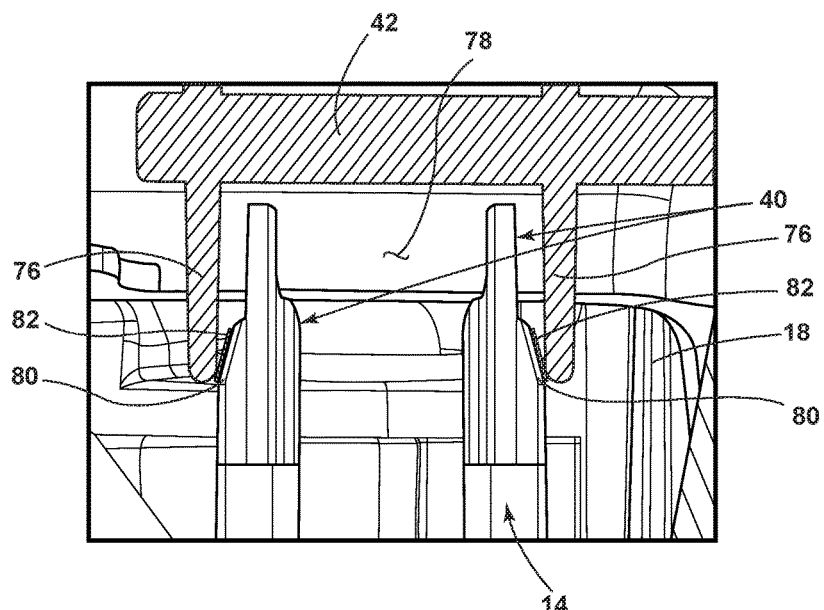
FIG. 4C is a cross-sectional view of the overhead console taken along the line IVB-IVB of FIG. 4A.

Referring to FIGS. 3-4C, the housing 18 may include one or more locators 40. As illustrated, the locators 40 may extend vehicle forward of the housing 18. The locators 40 may be configured to interact with a headliner support member 42 to align the housing 18 in a vertical direction, a cross-car direction, and/or in a vehicle forward/rearward direction. When installed within the vehicle 10, the housing 18 may be at least partially surrounded by the headliner 16. The headliner 16 may include a backing panel 58 and a foam panel 60 attached to the backing panel 58. The backing panel 58 may at least partially support the mounting of the overhead console 14. The backing panel 58 can be a polymeric panel, a fiberglass panel, or any other desired material. The backing panel 58 and foam panel 60 may have any desired thickness. According to various examples, the foam panel 60 maintains a substantially uniform thickness along the backing panel 58. Alternatively, the foam panel 60 may have a variable thickness based on the location of the foam panel 60 in relation to other features of the vehicle cabin 12. It is contemplated that the backing panel 58 may be attached to the roof structure through any means known in the art without departing from the teachings provided herein.

The bottom surface of foam panel 60 may be covered with a decorative cover 62, which can be a woven or non-woven fabric, textile, polymeric, and/or elastomeric material. A pattern may be disposed on the cover 62. The pattern may take any form such as a landscape graphic, a natural wood or stone image, a design, a shape or indicia. Further, the pattern may be provided with virtually any color or design and in any level of detail.

The headliner support member 42 may be operably coupled with the backing panel 58 of the headliner 16. The support member 42 may include a base portion 64 that extends along the substrate. A body portion 66 may extend upwardly of the base portion 64. Moreover, an attachment portion 68 may extend from the body portion 66. A catch 70 may be disposed on the attachment portion 68 that may operably couple with a portion of the locator 40. The locator 40 disposed on the housing 18 may include an upper section 72 that is disposed upwardly of the attachment portion 68 and a lower section 74 that is disposed below the decorative cover 62 of the headliner 16. The lower section 74, in addition to retaining and/or locating the housing 18, may also conceal a space between the headliner 16 and the housing 18. The attachment portion 68 may be resiliently deformable. Due to the position of the housing 18 below the headliner 16 and above the attachment portion 68, the housing 18 may be located in a predefined position within the vehicle 10.

Moreover, the locator 40 may also have a width that is less than a pair of flanges 76 extending from the support member 42. In some examples, the locator 40 is disposed between the pair of flanges 76 to align the locator 40, and housing 18, in the cross-car direction. As illustrated in FIG. 4C, the locator 40 may define a central void 78. However, in some examples, the locator 40 may have a solid central section without departing from the scope of the present disclosure.

Moreover, a peripheral section of the locator 40 may have chamfered surfaces 80 to assist in directing the locator 40 to a desired position. The chamfered surfaces 80 may be of any desired thickness based on a desired tolerance of the components. Moreover, the locator 40 and the bracket 44 may be formed of materials that are known to minimize noise, vibration, and/or harshness (NVH) when disposed in close proximity to one another. For example, the bracket 44 and the locator 40 may each be formed from a material such as polypropylene. However, it will be appreciated that any component described herein, including the locator 40, the housing 18, and the bracket 44, may be formed from any desired and/or practicable material without departing from the teachings provided herein. Additionally and/or alternatively, in some examples, an NVH material 82 may be disposed between the locator 40 and the bracket 44 to minimize additional noise during operation of the vehicle 10. The NVH material 82 may be any component known in the art, including but not limited to, a fibrous tape.

In some examples, the housing 18 may include a bezel 84 and the locators 40 may be integrally formed with the bezel 84. The bezel 84 may provide any desired styling through a decorative material disposed thereon and/or therein. In various examples, the decorative material may confer a plurality of various patterns, textures, colors, etc. The decorative material can provide a desired aesthetic appearance through any method known in the art, including, but not limited to, sputter deposition, vacuum deposition (vacuum evaporation coating), electroplating, and/or printing a material onto the bezel 84. The decorative material may be chosen from a wide range of materials and/or colors, including, but not limited to, silver, chrome, copper, bronze, gold, or any other metallic surface. Additionally, an imitator of any metallic material may also be utilized without departing from the teachings provided herein. Moreover, the bezel 84 may be otherwise colored any other color through any other process known in the art without departing from the scope of the present disclosure.

In various examples, the bezel 84 may have a textured or grained surface. The grained surface may be produced by laser etching the bezel 84 and may provide the bezel 84 with a varied or common appearance to proximately disposed components of the overhead console 14. Likewise, any other component of the overhead console 14 may be colored any desired color and/or have a textured or grained surface that is similar or varied from the bezel 84. It will be appreciated that any other portion of the overhead console 14 may also have a decorative material thereon, be colored any desired color, and/or have any textured or grained surface without departing from the scope of the present disclosure.

Figure 5A:
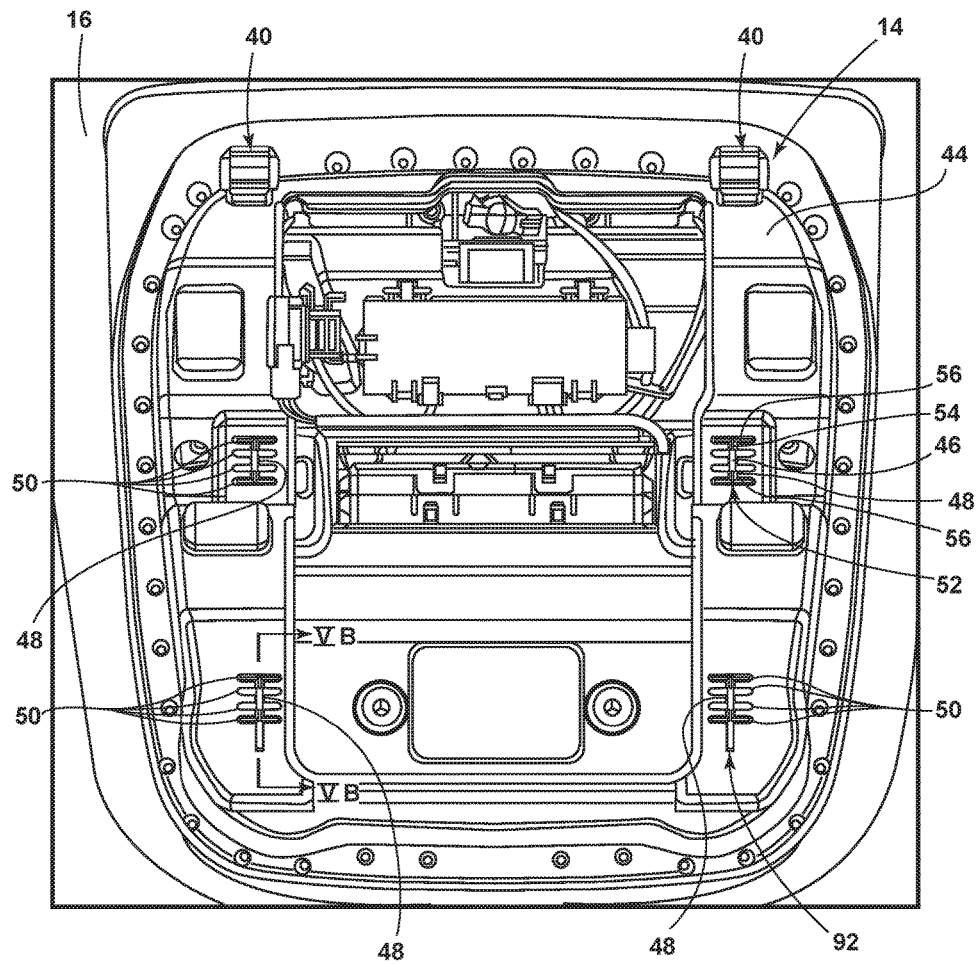
FIG. 5A is a top plan view of the overhead console and the bracket, according to some examples.
Figure 5B:
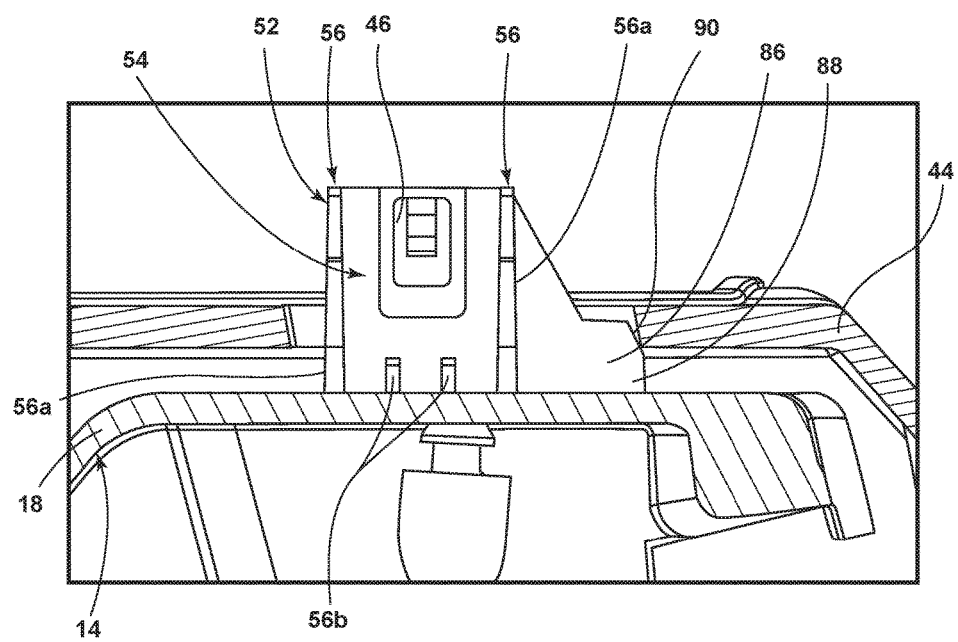
FIG. 5B is a cross-sectional view of the overhead console and the bracket taken along the line VB-VB of FIG. 5A.
Figure 5C:
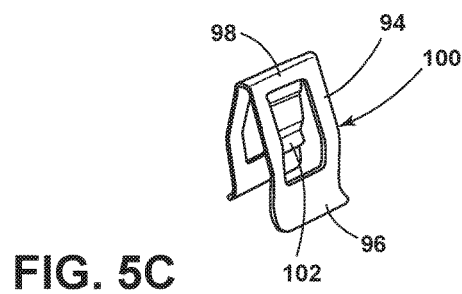
FIG. 5C is a perspective view of a retainer, according to some examples.

Referring to FIGS. 5A-5C, the housing 18 includes one or more retainer towers 52 attached thereto. In some examples, the retainer towers 52 may be integrally formed with the housing 18. As illustrated, the retainer towers 52 may include ribs 56 thereon. For example, the retainer towers 52 may include one or more outer ribs 56*a* of a first height. The retainer towers 52 may also include one or more interior ribs 56*b* of a second height. In some examples, the second height may be less than the first height. It will be appreciated that the retainer towers 52 may include an integrally formed retaining assembly and/or any device that is configured to maintain the housing 18 in close proximity to the bracket 44 without departing from the teachings of the present disclosure.

A locating tab 86 may extend from one or both sides of the retainer tower 52. In some examples, the locating tab 86 includes a base portion 88 with a vehicle forward/rearward locating surface 90. In some examples, the locating surface 90 may be chamfered and/or otherwise offset from proximate surfaces. During installation, the locators 40 on the housing 18 are coupled with the bracket 44. Then, the housing 18 is rotated upwardly. As the housing 18 is rotated upwardly, the locating surface 90 of the tab may contact an end portion 92 of the channel 48. The contact of the locating surface 90 along the end portion 92 of the channel 48 moves the housing 18 into a desired vehicle forward/rearward direction. Moreover, the side surfaces of the locating tab 86 may also locate the housing 18 in a vehicle side-to side direction as well. In some examples, an upper portion of the tab may have varied thickness and extend towards a top portion of the retainer tower 52. The tab may be integrally formed with the housing 18 and/or the tower in some instances. In other instances, the tab may be later attached to the housing 18 and/or the tower. In some instances, the channel 48 has a length longer than the length of the retainer tower 52 and the locating tab 86 and the rib 56 having a width less than the transverse slot 50.

A clip or retainer 46 may be disposed between the outer ribs 56a. The retainer 46 may include legs 94 and feet 96 extending respectively from the legs 94. The legs 94 may have a central portion 100 that extends further from the retainer tower 52 than a head portion 98 separating the legs 94. The central portion 100 may be resiliently deformed as the retainer 46 is inserted through the attachment point of the bracket 44. Once disposed through the attachment point of the bracket 44, the central portion 100 may return to a position further from the retainer towers 52 than it was in as the central portion 100 is disposed within the channel 48. Accordingly, the clip may fixedly retain the retainer towers 52, and the housing 18, to the bracket 44. The central portion 100 has a size, such as a width, length, thickness and a pivot point to provide higher extraction force levels than an insertion force level. Additionally, the width of the central portion 100 may be increased to further increase the strength of the retainer 46 and thus increase the extraction force. Alternatively, the width of the central portion 100 may be decreased, or the central portion 100 may have different widths to achieve any desired insertion force, extraction force, or ratio. It will be appreciated that the legs 94 and feet 96 may have any suitable shape without departing from the scope of the present disclosure. Moreover, any other clip and/or retainer 46 may be used in conjunction with or in lieu of the retainer 46 described herein without departing from the teachings of the present disclosure.

In some examples, the retainer 46 may also include projections 102. In some examples, the projections 102 may be configured to secure the retainer 46 to the retainer towers 52. In some instances, the projections 102 are bent towards the inside of the retainer 46. By inserting the retainer 46 over the retainer towers 52, the projections 102 bend backward and "dig" into the retainer towers 52 to assist in preventing the retainer 46 from being removed. In such instances, the projections 102 may alternatively be referred to as "barbs."

Figure 6A:
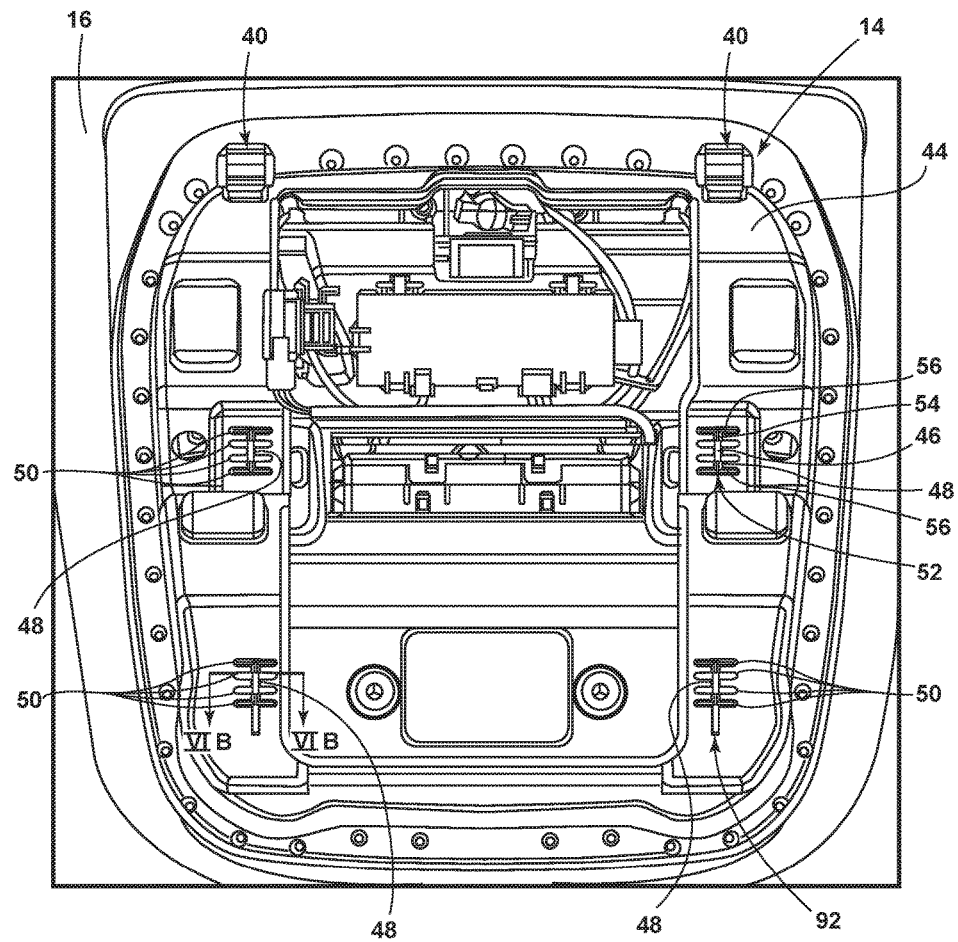
FIG. 6A is a top plan view of the overhead console and the bracket defining one or more channels, according to some examples.
Figure 6B:
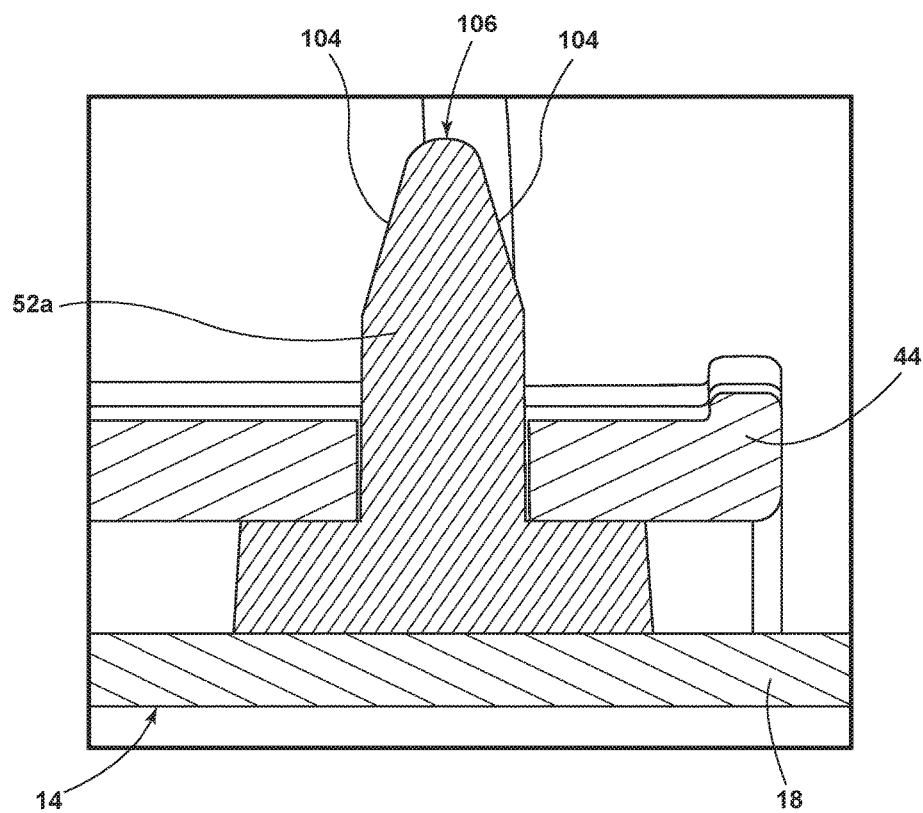
FIG. 6B is a cross-sectional view of the overhead console and the bracket taken along the line VIB-VIB of FIG. 6A.

Referring to FIGS. 6A and 6B, the outer ribs 56a (FIG. 5B), and in some instances, the interior ribs 56b (FIG. 5B) may be disposed within the transverse slots 50 in an installed position. The ribs 56 may have a thickness that is less than the transverse slots 50. It will be appreciated that the ribs 56 may have any width that is less than the transverse slots 50 to create any desired variability in cross-car placement of the housing 18. As the thickness of the ribs 56 approaches the width of the transverse slots 50, tighter tolerances are created. As provided above, an NVH material 82 may be disposed between the ribs 56 and the bracket 44 if desired.

As illustrated in FIG. 6B, a top portion of the rib 56 may have a chamfered surfaces 104 on opposing sides and a radiused portion 106 disposed between the chamfered surfaces 104. The chamfered surfaces 104 and a radiused portion 106 may assist is disposing the retainer towers 52 and/or ribs 56 through the channel 48 and transverse slots 50 of the bracket 44.

Use of the present disclosure may offer a variety of advantages. For instance, use of the overhead console provided herein may include one or more locators and one or more towers that may each assist in placing the overhead console in a predefined position. Moreover, the locators and towers provided herein may assist in placing the overhead console in a more repeatable position during installation. Moreover, the locators help in minimizing the number of retainer towers, and clips, need to install the overhead console leading to reduced cost and complexity during assembly.

According to one aspect of the present disclosure, a vehicle overhead console is provided herein. The vehicle overhead console a housing having a locator and a retainer tower extending vertically above the housing, the retainer tower having a rib. A bracket is configured to couple to a vehicle headliner and defines a channel. The channel includes a central channel and a plurality of transverse slots. The retainer tower is disposed within the central channel and the rib is disposed within the transverse slots. Examples of the vehicle overhead console can include any one or a combination of the following features:

- the locator extends vehicle forward of the housing;
- a support member operably coupled with the vehicle headliner;
- the locator includes an upper section disposed above the support member and a lower section disposed below the vehicle headliner;
- the support member includes a base portion that extends along the vehicle headliner, a body portion extending upwardly of the base portion, and an attachment portion extending from the body portion;
- the support member includes a pair of flanges, the locator having a width that is less than the pair of flanges extending from the support member;
- the locator is integrally formed with a bezel;
- a locating tab extending from the retainer tower, wherein the locating tab includes a base portion with a vehicle forward/rearward locating surface;
- a top portion of the rib has chamfered surfaces on opposing sides and a radiused portion disposed between the chamfered surfaces;
- the rib is configured as a pair of ribs extending along a periphery of the retainer tower; and/or
- the retainer tower further includes one or more interior ribs, the interior ribs having a height that is less than the pair of ribs extending along a periphery of the retainer tower.

Moreover, a method of manufacturing a vehicle is provided herein. The method includes forming a housing having a locator and a retainer tower extending vertically above the housing, the retainer tower having a rib. A bracket is operably coupled to a vehicle headliner, the bracket defining a channel. The channel includes a central channel and a plurality of transverse slots. The retainer tower is placed within the central channel causing the rib to be disposed within the transverse slots.

According to another aspect of the present disclosure, an overhead console for a vehicle is provided herein. The overhead console includes a housing having a locator and a retainer tower. A bracket is configured to couple to a vehicle headliner and defines a channel. The retainer tower has a width that is less than a width of the channel. A support member is operably coupled with the vehicle headliner. The locator includes an upper section disposed above the support member and a lower section disposed below the vehicle headliner. Examples of the overhead console for a vehicle can include any one or a combination of the following features:

- the channel includes a central channel and a plurality of transverse slots and the tower is disposed within the central channel and a rib of the retainer tower is disposed within the transverse slots;
- a locating tab extending from the retainer tower, wherein the locating tab includes a base portion with a vehicle forward/rearward locating surface;
- the locator is integrally formed with a bezel; and/or
- the support member includes a base portion that extends along the vehicle headliner, a body portion extending upwardly of the base portion, and an attachment portion extending from the body portion.

According to yet another aspect of the present disclosure, a vehicle overhead console is provided herein. The vehicle overhead console includes a housing having a retainer tower extending vertically above the housing, the retainer tower having a rib. A locating tab extends from the retainer tower. A bracket is configured to couple to a vehicle headliner and defines a channel. The channel has a length longer than a length of the retainer tower and the rib has a width less than a width of the transverse slot. Examples of the vehicle overhead console can include any one or a combination of the following features:

- the locating tab includes a base portion with a vehicle forward/rearward locating surface;
- a support member operably coupled with the vehicle headliner; and a locator on the housing operably coupled with the support member to locate the housing in a vehicle forward/rearward direction; and/or
- the support member includes a pair of flanges, the locator having a width that is less than the pair of flanges extending from the support member to locate the housing in a cross-car direction.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle overhead console, comprising:
   a housing having a locator and a retainer tower extending vertically above the housing, the retainer tower having a rib; and
   a bracket configured to couple to a vehicle headliner and defining a channel, wherein the channel includes a central channel and a plurality of transverse slots and the retainer tower is disposed within the central channel and the rib is disposed within one of the transverse slots.

2. The vehicle overhead console of claim 1, wherein the locator extends vehicle forward of the housing.

3. The vehicle overhead console of claim 1, further comprising:
a support member operably coupled with the vehicle headliner.

4. The vehicle overhead console of claim 3, wherein the locator includes an upper section disposed above the support member and a lower section disposed below the vehicle headliner.

5. The vehicle overhead console of claim 3, wherein the support member includes a base portion that extends along the vehicle headliner, a body portion extending upwardly of the base portion, and an attachment portion extending from the body portion.

6. The vehicle overhead console of claim 5, wherein the support member includes a pair of flanges, the locator having a width that is less than a width of the pair of flanges extending from the support member.

7. The vehicle overhead console claim 1, wherein the locator is integrally formed with a bezel.

8. The vehicle overhead console of claim 3, further comprising:
a locating tab extending from the retainer tower, wherein the locating tab includes a base portion with a vehicle forward/rearward locating surface.

9. The vehicle overhead console of claim 8, wherein a top portion of the rib has chamfered surfaces on opposing sides and a radiused portion disposed between the chamfered surfaces.

10. The vehicle overhead console of claim 3, wherein the rib is configured as a pair of ribs extending along a periphery of the retainer tower.

11. The vehicle overhead console of claim 10, wherein the retainer tower further includes one or more interior ribs, the interior ribs having a height that is less than the pair of ribs extending along a periphery of the retainer tower.

12. An overhead console for a vehicle, comprising:
a housing having a locator and a retainer tower;
a bracket configured to couple to a vehicle headliner and defining a channel, wherein the retainer tower has a width that is less than a width the channel; and
a support member operably coupled with the vehicle headliner, wherein the locator includes an upper section disposed above the support member and a lower section disposed below the vehicle headliner.

13. The overhead console for a vehicle of claim 12, wherein the channel includes a central channel and a plurality of transverse slots and the tower is disposed within the central channel and a rib of the retainer tower is disposed within one of the transverse slots.

14. The overhead console for a vehicle of claim 12, further comprising:
a locating tab extending from the retainer tower, wherein the locating tab includes a base portion with a vehicle forward/rearward locating surface.

15. The overhead console for a vehicle of claim 12, wherein the locator is integrally formed with a bezel.

16. The overhead console for a vehicle of claim 12, wherein the support member includes a base portion that extends along the vehicle headliner, a body portion extending upwardly of the base portion, and an attachment portion extending from the body portion.

17. A vehicle overhead console, comprising:
a housing having a retainer tower extending vertically above the housing, the retainer tower having a rib;
a locating tab extending from the retainer tower; and
a bracket configured to couple to a vehicle headliner and defining a channel and a transverse slot, wherein the channel has a length longer than a length of the retainer tower and the rib having a width less than a width of the transverse slot.

18. The vehicle overhead console of claim 17, wherein the locating tab includes a base portion with a vehicle forward/rearward locating surface.

19. The vehicle overhead console of claim 17, further comprising:
a support member operably coupled with the vehicle headliner; and
a locator on the housing operably coupled with the support member to locate the housing in a vehicle forward/rearward direction.

20. The vehicle overhead console of claim 19, wherein the support member includes a pair of flanges, the locator having a width that is less than the pair of flanges extending from the support member to locate the housing in a cross-car direction.

* * * * *